US012662203B2

(12) United States Patent (10) Patent No.: US 12,662,203 B2
Goldwitz (45) Date of Patent: Jun. 23, 2026

(54) SIDE WIND PROTECTOR

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 301 days.

(21) Appl. No.: 18/649,079

(22) Filed: Apr. 29, 2024

(65) Prior Publication Data

US 2024/0359754 A1 Oct. 31, 2024

Related U.S. Application Data

(60) Provisional application No. 63/462,984, filed on Apr. 29, 2023.

(51) Int. Cl.
B62D 35/00 (2006.01)
B60R 1/078 (2006.01)
(52) U.S. Cl.
CPC ............ B62D 35/008 (2013.01); B60R 1/078 (2013.01)
(58) Field of Classification Search
None
See application file for complete search history.

(56) References Cited

U.S. PATENT DOCUMENTS

| | | | | |
|---|---|---|---|---|
| 4,070,056 A | * | 1/1978 | Hickman | B60J 5/0487 49/501 |
| 5,516,073 A | * | 5/1996 | McMahan | B60R 1/06 248/549 |
| 7,980,345 B1 | * | 7/2011 | Harvey | B62J 29/00 74/564 |
| 8,720,977 B2 | * | 5/2014 | Nakamura | B60J 5/0413 49/502 |
| 10,106,019 B2 | * | 10/2018 | Rafeld | B60J 5/0476 |
| 2022/0111708 A1 | * | 4/2022 | Krapfl | B60J 5/0463 |

* cited by examiner

*Primary Examiner* — Joseph D. Pape
(74) *Attorney, Agent, or Firm* — Furr Law Firm; Jeffrey M. Furr

(57) ABSTRACT

The current invention is a side wind protector. It allows for the blocking and channeling the air away from the cab when a removable door has been removed. The side wind protector connects to the vehicle in front of the door frame (the open area when the door is remove) and buffers and channels the air away from the opening and the cab. It is slight angle backwards and can incorporate a mirror. In one embodiment it can be installed in the hinges where the door was attached. It can be attached to either side or both sides of the vehicle.

11 Claims, 9 Drawing Sheets

50

20

10

60

SIDE WIND PROTECTOR

RELATED APPLICATIONS

It is a non-provisional of provisional application 63/462,984 filed Apr. 29, 2023 and claims its priority date.

TECHNICAL FIELD

The technology discussed below relates to a wind protector and more particularly one that is located on the front side of a vehicle.

BACKGROUND

People with SUV and jeeps or vehicles with removable doors will have a problem with wind or air flowing into the cab making it too cold or uncomfortable to enjoy the ride.

There currently no easy method to buffer the wind or air coming into the cab and on the driver or passengers.

There is still room for improvement in the art.

SUMMARY

The current invention is a side wind protector. It allows for the blocking and channeling the air away from the cab when a removable door has been removed. The side wind protector easily connects to the vehicle in front of the door frame (the open area when the door is remove) and buffers and channels the air away from the opening and the cab. It is slight angle backwards and can incorporate a mirror or can be used around the vehicles current side mirror. In one embodiment it can be installed in the hinges where the door was attached.

These are improvements over the current art.

DRAWINGS

DETAILED DESCRIPTION

Figure 1:
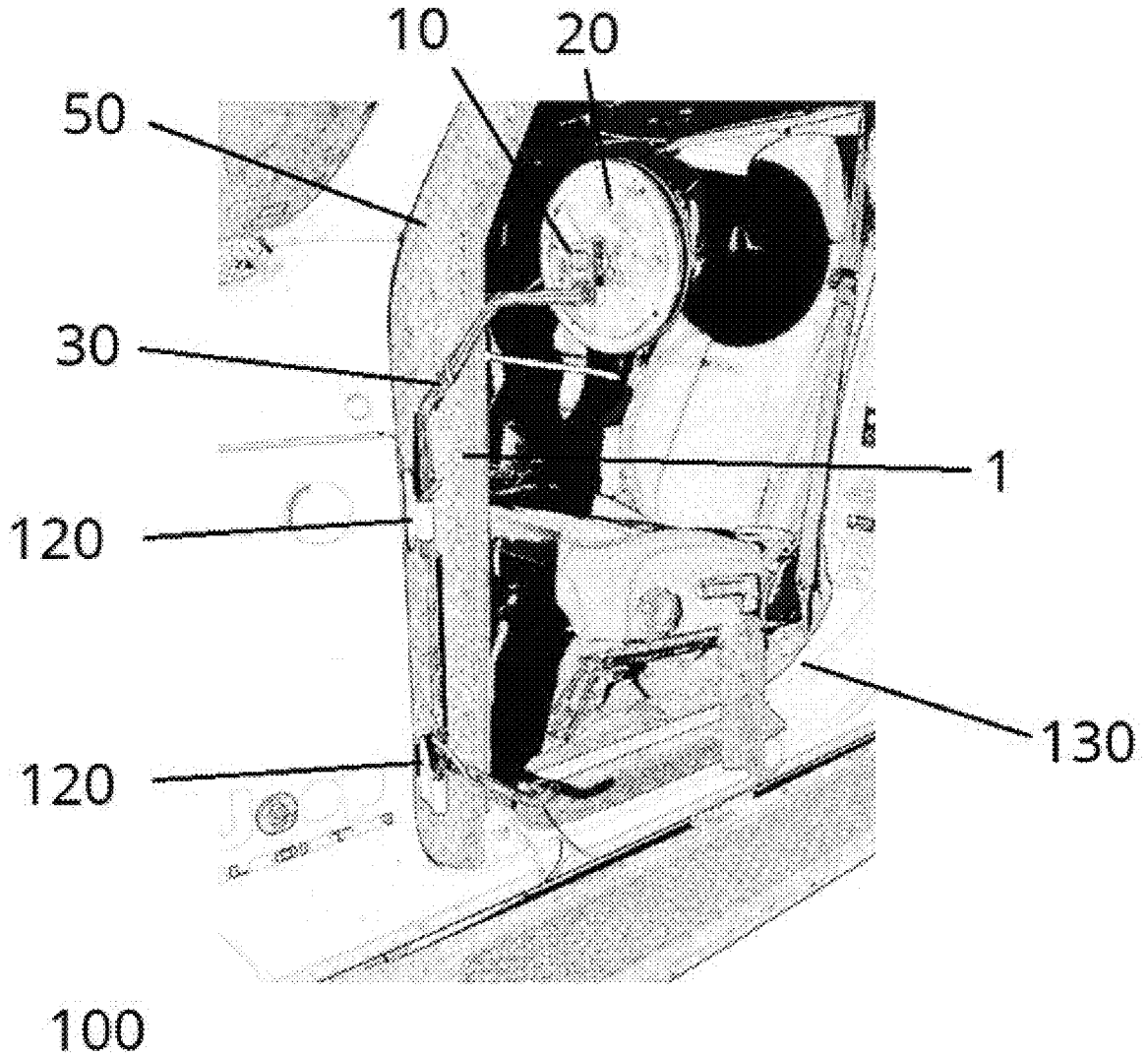
FIG. 1 show the side wind protector installed on a vehicle.

The illustrations presented herein are, in some instances, not actual views of any particular framing devices or components thereof but may be idealized representations which are employed to describe the present disclosure. Additionally, elements common between figures may retain the same numerical designation.

The current invention, as shown in FIGS. 1 through 9, is a side wind protector 1. It allows for the blocking and channeling the air away from the cab 100 when a removable door has been removed leaving an open-door frame 130.

In the preferred embodiment, the main components of the side wind protector 1 are the wind shield 50, hinge pins 60 and support bar 30. The side wind protector can also have a mirror socket 10 and a mirror 20.

The side wind protector 1 connects to the vehicle 100 in front of the door frame 130 (the open area when the door is remove) and the wind shield 50 buffers and channels the air away from the opening 130 and the cab 100. The side wind protector 1 has the wind shield 50 that has a slight angle outward and backwards from the vehicle 100. The side wind protector 1 can incorporate a mirror 20. In one embodiment it can be installed in the hinges 120 where the door was attached using hinge pins 60 attached to the side wind protector 1. The hinge pins 60 are located on the side wind protector 1 inner side at a height the matches the door hinges 120 of the vehicle 100.

Figure 2:
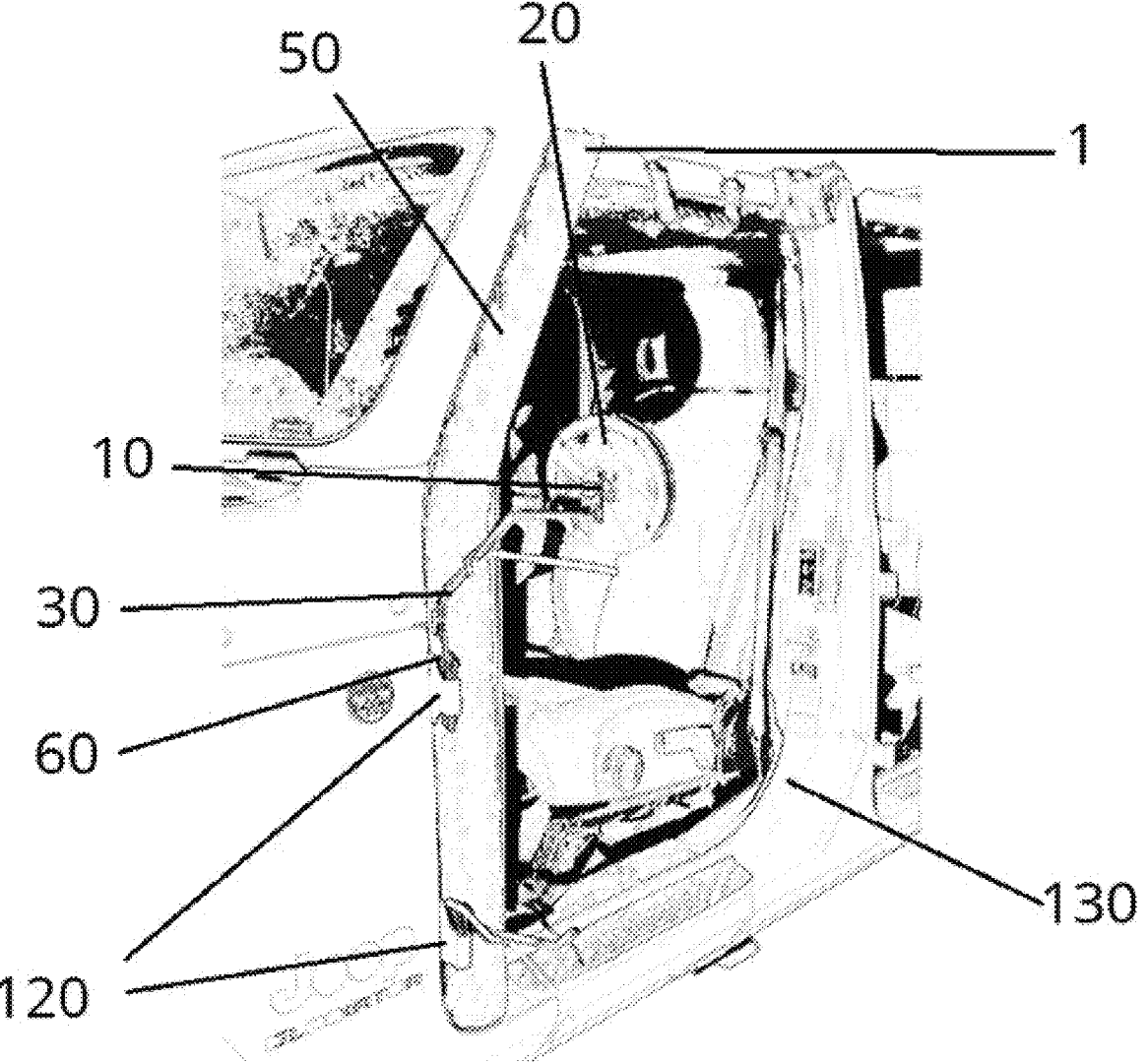
FIG. 2 shows another view of the side wind protector being installed on a vehicle.

FIGS. 1 and 2 show the side wind protector installed on a vehicle 100. The side wind protector 1 extends slightly away from the vehicle 100 and can have a mirror 20 attached or have the side wind protector positioned in front or back of the vehicle's side mirror. A side wind protector 1 can be located on both or either side of the vehicle 100. With the passenger's side wind protector 1 being a mirrored image of the driver's side wind protector 1.

Figure 3:
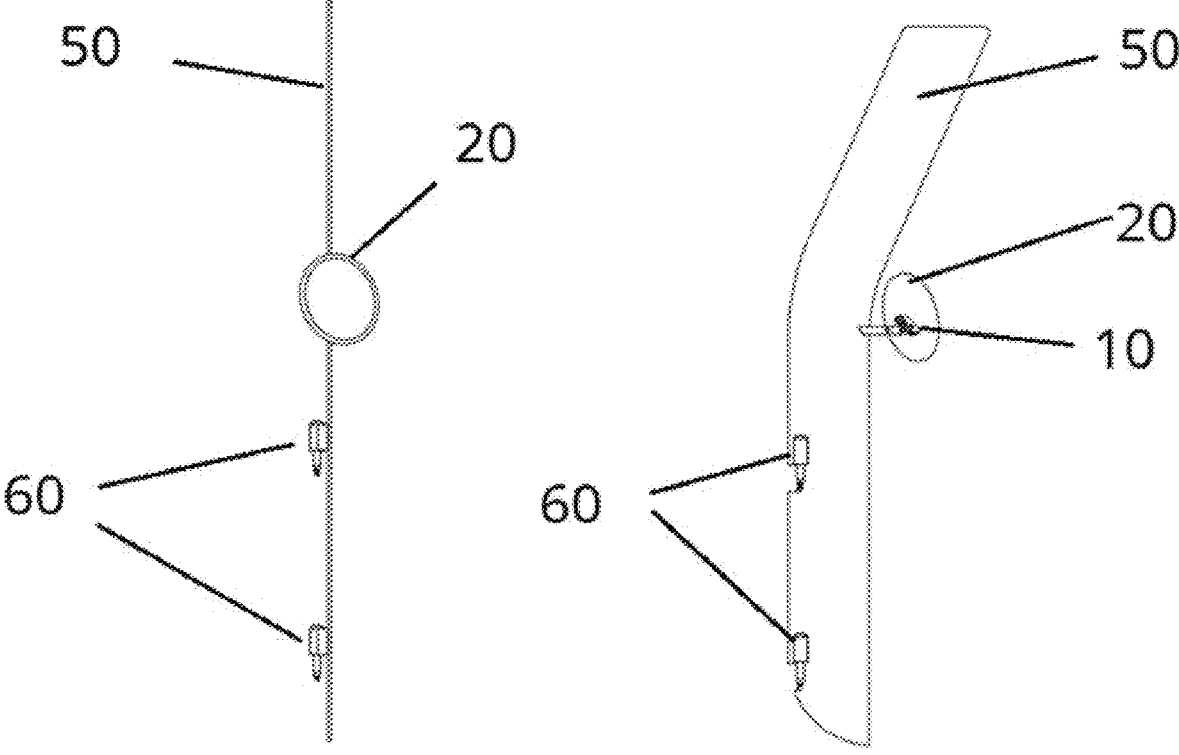
FIG. 3 shows a back view and side view of the side wind protector.
Figure 4:
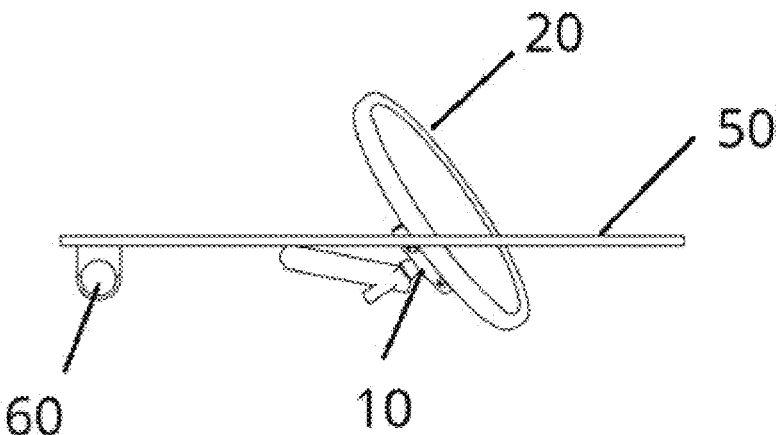
FIG. 4 shows a top view of the side wind protector.
Figure 5:
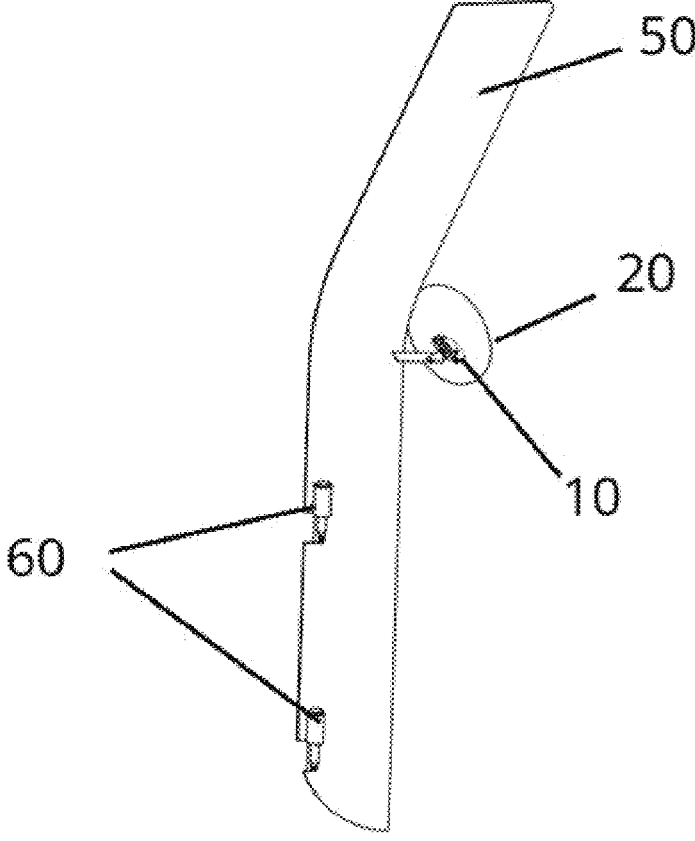
FIG. 5 shows a back view of the side wind protector.

FIGS. 3 and 5 shows a back view and side view of the side wind protector 1 where the hinge pins 60 are connected directly to the wind shield 50 forming a solid side wind protector 1. This solid side wind protector 1 has the mirror 20 also directly attached to the wind shield 50. FIG. 4 shows this configuration in a top view. This embodiment has a side mirror 20 attached to it and is connected to the vehicle 100 by hinge pins 60 that fit into the door hinges 120 securing it to the vehicle 100. The side wind protector 1 extends out away from the vehicle at an angle to channel the air away from the vehicle 100. The side wind protector 1 extends perpendicularly straight from the bottom and angles back so that its shape matches the door opening 130 of the vehicle 100 to make sure that the wind is reposition from the cab.

Figure 6:
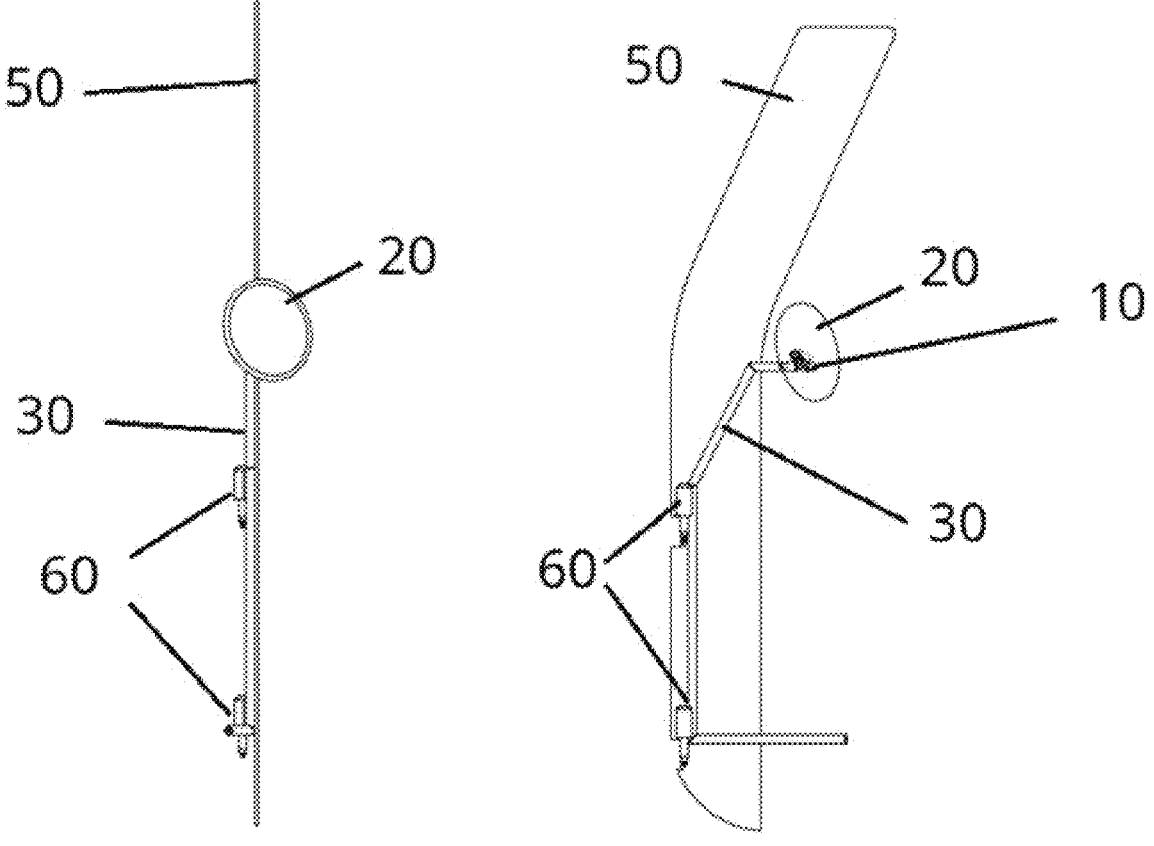
FIG. 6 shows a side and front view of an alternative embodiment.
Figure 7:
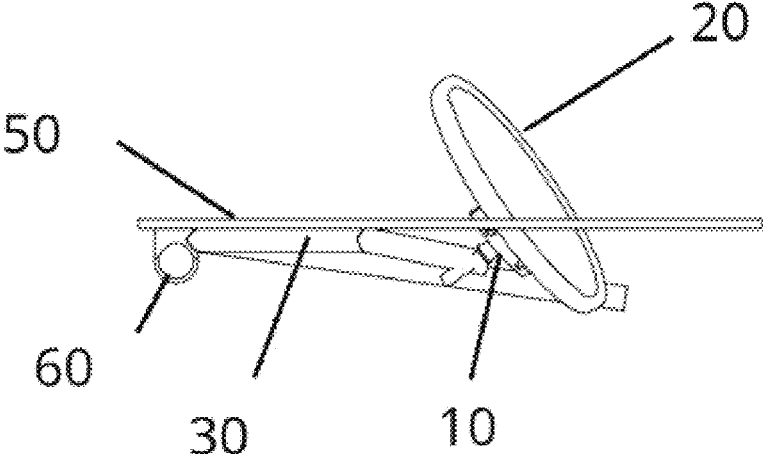
FIG. 7 is a top view of an alternative embodiment.
Figure 8:
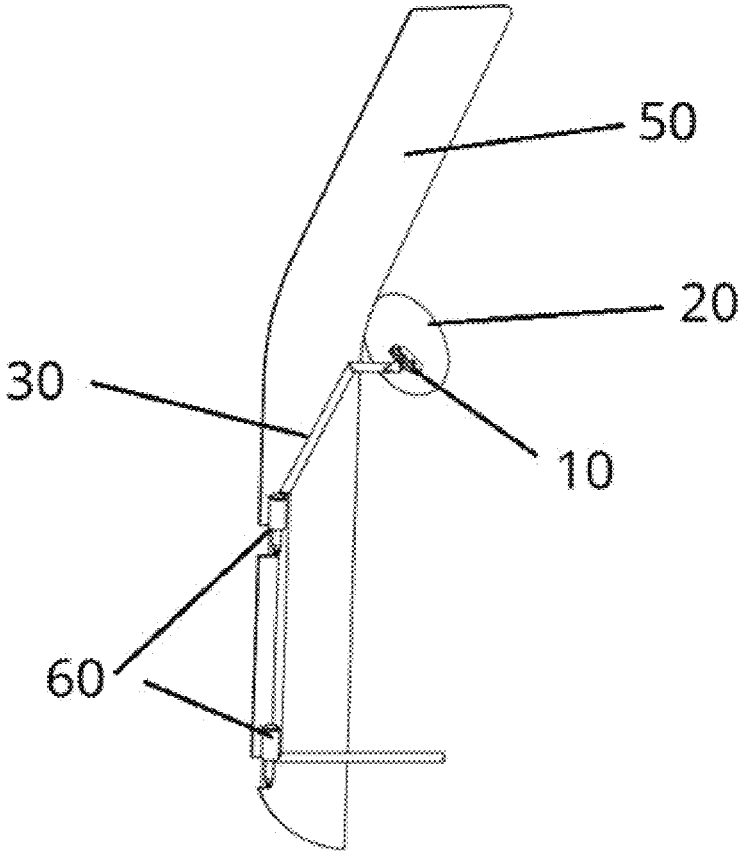
FIG. 8 shows a front view of an alternative embodiment.

FIG. 6 shows a side and front view of an alternative embodiment where the side wind protector 1 is positioned in front of the side mirror of the car and has a support bar 30 that runs the length of the side wind protector 1. The hinge pins 60 will be attached to the support 60 with the support bar 30 adjustable allowing the hinge pins 60 to be moved into the proper place to be placed in the door hinges 120. FIG. 7 is a top view of an alternative embodiment and FIG. 8 shows a front view of an alternative embodiment.

Figure 9:
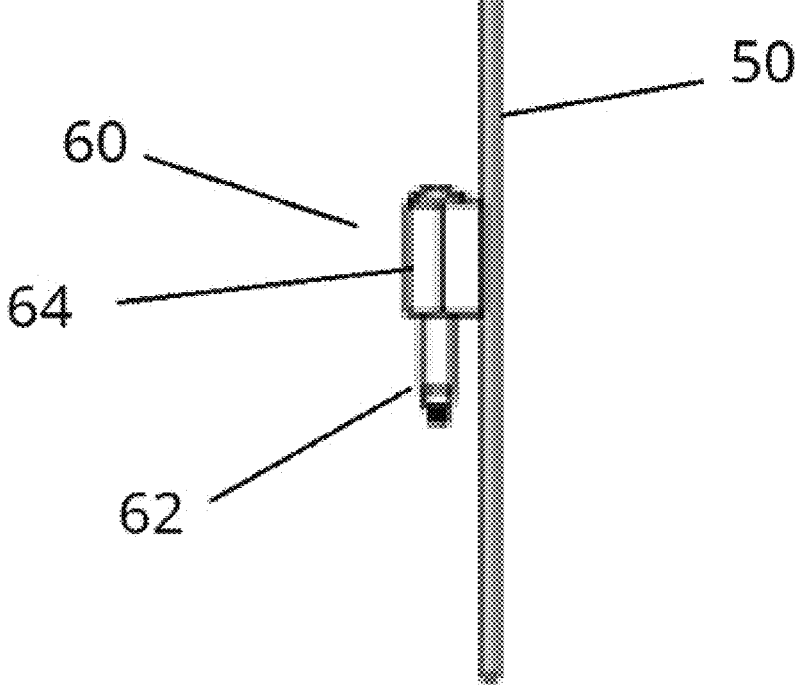
FIG. 9 shows a close up of the hinge pins.

FIG. 9 shows a close up of the hinge pins 60 showing the pin 62 and the block 64. The pin 62 goes in the in the hinge 120 up to the block 64 where the block has a greater diameter than the hinge 120 and rests on the top of the hinge 120. The pin 62 has a diameter that fits into the hinge 120 and has a length greater than the hinge 120. The plurality of hinge pins 60 allow for the easy securing of the side wind protector 1 with the side wind protector 1 side facing the vehicle 100 being flushed against the vehicle 100. The pin 62 can have a threaded end where it can be secured by a normal or winged nut.

In one embodiment, the support bar 30 is attached to the wind shield 50 and extends out from the wind shield 50 to a mirror socket 10 at the end to hold the mirror 20. The mirror socket 10 is adjustable so that the mirror 20 can be moved to a proper position for the driver of the vehicle 100. This embodiment is shown in FIGS. 6, 7 and 8. In the preferred embodiment the support bar 30 goes from the mirror socket 10 to secure it in place to the inner side of the wind shield 50 to the hinge pins 60. The support bar 30 can have an extension at the bottom that extends out from the wind shield 50 allowing for the easier installing and removing the side wind protector 1. The mirror socket 10 attached to the top of the support bar 30. A mirror 20 can also be attached directly to the support bar 30.

In another embodiment, the mirror socket 10 is connected directly to the wind shield 50 without a support bar 30. This embodiment is shown in FIGS. 3, 4 and 5.

The wind shield 50 is made of a thin strong material such as a light metal or heavy plastic. It has rounded edges with a length slightly longer than the door opening 130.

The wind shield 50 angles back away from the vehicle to move the air flow out and away from the door opening 130 so that it does not enter the cab making sure that the air does not hit the driver or the passenger. The wind shield 50 inner shape follows the contour of the vehicle 100 that the shield is attached to.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A side wind protector for a vehicle having a cab comprising:

a wind shield for blocking and channeling an air flow away from the cab when a removable door has been removed where the wind shield extends vertically from a bottom therefore and then angles back from a vertical direction relative to a front of the vehicle where the wind shield extends rearwardly from a front edge thereof slightly angled outward and backward from the vehicle to move the air flow out and away from an open-door frame when the removable door has been removed, and having a plurality of hinge pins, where the plurality of hinge pins have a pin and a block, where each pin is placed in a vehicle hinge with the block resting on the top of each hinge, where the pin has a diameter that fits into the hinge and has a length greater than the hinge, and where each block has a diameter greater than the hinge.

2. The side wind protector according to claim 1 comprising:

a mirror attached to the wind shield.

3. The side wind protector according to claim 1 comprising:

an adjustable mirror socket that is attached to the wind shield and a mirror attached to the mirror socket.

4. The side wind protector according to claim 1 comprising:

a support bar attached to the wind shield.

5. The side wind protector according to claim 4 comprising:

a mirror attached to the support bar.

6. The side wind protector according to claim 4 comprising:

an adjustable mirror socket that is attached to the support bar and a mirror attached to the mirror socket.

7. The side wind protector according to claim 1:

where the wind shield is made of a thin strong material.

8. The side wind protector according to claim 1:

where the wind shield rounded edges.

9. The side wind protector according to claim 1:

where the wind shield has an inner shape that follows the contour of the vehicle that the wind shield is attached to.

10. The side wind protector according to claim 4 comprising:

where the hinge pins are attached to the support bar and the support bar adjusts the location of the hinge pins.

11. A process to prevent wind from entering a vehicle cab comprising:

using the side wind protector of claim 1.

\* \* \* \* \*